May 5, 1942.  W. H. GILLE  2,282,180
TEMPERATURE CONTROL SYSTEM
Filed Oct. 30, 1939
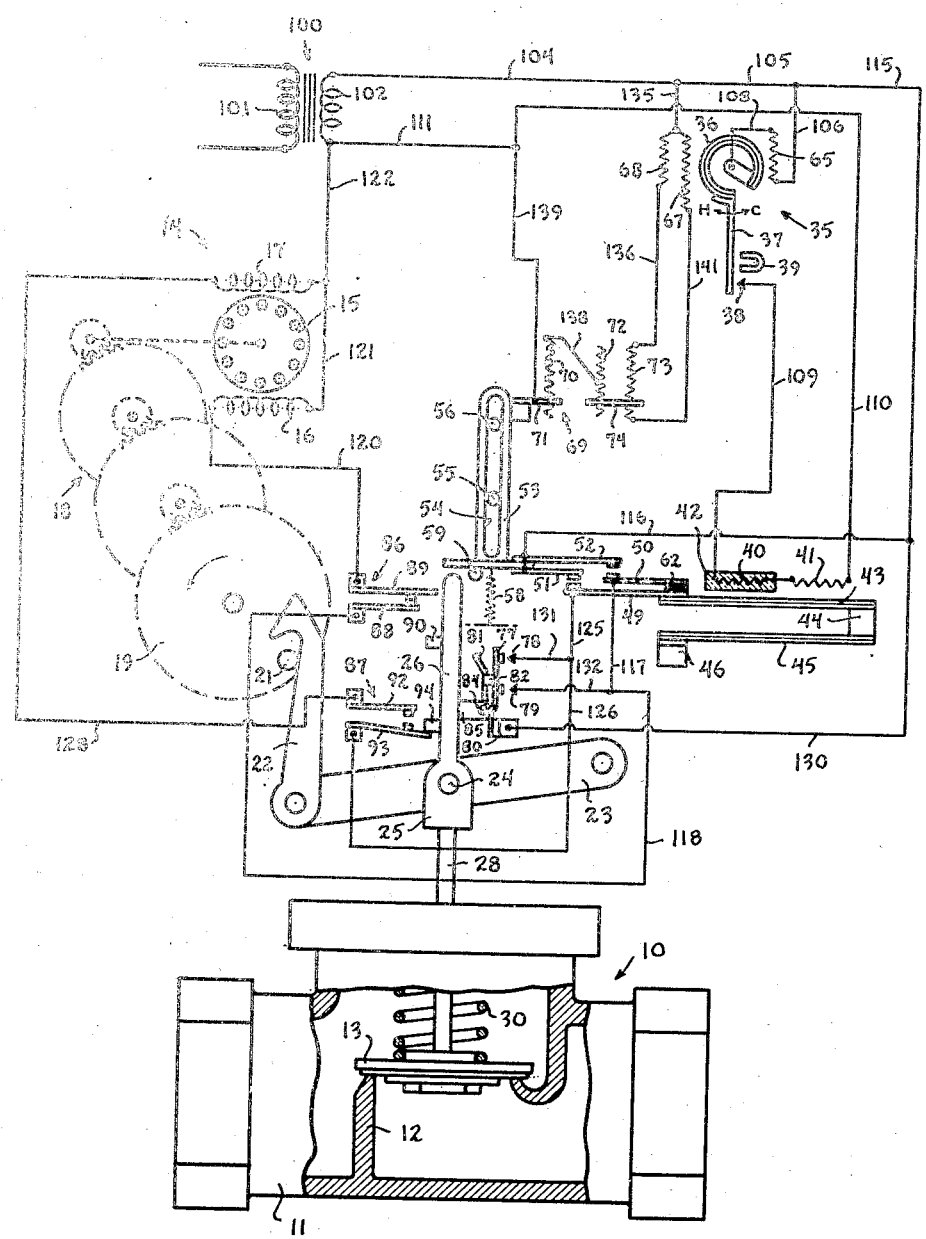
Inventor
Willis H. Gille
by George H. Fisher
Attorney Patented May 5, 1942

2,282,180

UNITED STATES PATENT OFFICE 2,282,180

TEMPERATURE CONTROL SYSTEM

Willis H. Gille, St. Paul, Minn., assignor to Minneapolis-Honeywell Regulator Company, Minneapolis, Minn., a corporation of Delaware Application October 30, 1939, Serial No. 301,879

14 Claims. (Cl. 236—68)

The present invention relates to a temperature control system and more particularly to improved temperature control means for regulating the flow of fuel to a burner of a heating device.

In the regulation of a temperature changing fluid such as the fuel to a gas burner, it is very desirable to modulate the flow of fluid so as to obtain as nearly as possible a continuous generation of heat. In the case of a fuel such as gas, it is essential, however, that the fuel flow not be reduced below a certain minimum value. It is further highly desirable when the burner is first placed into operation to initially establish a nearly maximum flow to insure adequate purging of air from the burner. If this is not done, an explosive mixture will be developed in the burner and this will be ignited resulting in the well known "pop back" in the mixer. The present invention is accordingly concerned with a modulating flow controller in which provision is made for insuring that the flow is never less than a predetermined minimum and at the beginning of burner operation is allowed to initially attain a maximum value before being modulated. Another difficulty with modulating controllers is that no provision is made for the heat stored in the heating plant upon an increase in burner operation. Thus where a gas valve is being modulated in accordance with room temperature and the room temperature drops for any reason so as to call for an increased amount of heat, the amount of heat stored in the furnace is increased. Unless recognition is made of this fact, there will be a tendency towards overshooting of the room temperature. The present invention further contemplates an arrangement whereby recognition is made of heat stored in the heating plant.

An object of the present invention is accordingly to provide an improved system wherein a flow controlling member is variably positioned in accordance with the value of a controlling condition and in which when the flow controlling member is in the minimum flow position and the condition is assuming a predetermined value, the flow controlling member is moved to its maximum position and back to a position corresponding to the value of the condition.

A further object of the present invention is to provide such an arrangement in which the energization of the positioning motor is regulated by controlling contacts positioned in accordance with the value of the controlling condition and by follow up contacts moved in accordance with the position of the flow controlling member.

A further object of the present invention is to provide such an arrangement in which the controlling contacts are positioned by a temperature responsive member which has associated therewith a heater which is periodically energized at periods the length of which is dependent upon the value of the controlling condition.

A still further object of the present invention is to provide an improved control system of the type wherein a device to be positioned is modulated by a temperature responsive element having a heater periodically energized in accordance with the value of the condition and in which the heater comprises two portions having different rates of heat delivery to the temperature responsive element to thereby result in more uniform positioning of the device.

A further object of the present invention is to provide an arrangement wherein a regulating member for a heating system is positioned in accordance with the controlling thermostatic device and in which the setting of the thermostat is lowered as the regulator is moved to heat increasing position.

A still further object of the present invention is to provide an arrangement such as set forth in the preceding object in which the thermostat is adjusted by the use of a heater adjacent the thermostatic element, the effect of which is varied in accordance with the position of the regulator.

A still further object of the invention is to provide such an arrangement wherein the heater adjacent the thermostatic element is an electric heater and in which the rate of heat transfer from the heater to the thermostatic element may be varied without varying the total amount of heat supplied thereby.

Other objects of the present invention will be apparent from a consideration of the accompanying specification, claims and drawing.

Referring to the drawing, the fluid flow controlling member is shown in the form of a valve 10 having a valve body 11 with the usual transverse partition wall 12. The partition wall is provided with an opening and a valve disc 13 seats upon a valve seat formed by this opening. A motor 14 is employed for positioning the valve. This motor comprises a squirrel cage rotor 15 and a pair of field windings 16 and 17. The field winding 16 constitutes a lifting winding and field winding 17 a holding winding, as will be subsequently explained in more detail. The rotor 15 is connected through a gear train 18 with driving gear 19. The gear 19 carries a projecting pin 21 which is adapted to engage a hook 22 pivotally secured to a lever 23. The lever 23 is pivotally secured at 24 to the enlarged lower end 25 of a rod 26. The enlarged end 25 is secured to the valve stem 28 which in turn is secured to the valve disc 13. A spring 30 engages the valve disc 13 and biases the same to its closed position. Upon energization of motor 14, gear 19 is rotated in a counterclockwise direction as indicated by the arrow thereon. This rotation of the gear causes the pin 21 to engage the upper portion of hook 22 and move the left-hand end of lever 23 upwardly to rotate lever 23 in a clockwise direction. This movement of lever 23 serves to move valve 13 towards open position against the biasing action of spring 30.

The primary controller for this system is a thermostat generally designated by the reference numeral 35. This thermostat comprises a bimetallic element 36 to which is secured a contact arm 37. This contact arm is adapted to be moved into and out of engagement with a fixed contact 38. A magnet 39 is associated with contact arm 37 to cause switch arm 37 to engage and disengage from contact 38 with an abrupt action. This eliminates any danger of sparking between contact arm 37 and fixed contact 38.

The thermostat 35 controls the energization of a pair of heaters 40 and 41. The heater 40 is insulated as indicated at 42 so as to decrease the rate of heat transfer from heater 40. The two heaters 40 and 41 are located adjacent a bimetallic element 43. Bimetallic element 43 is secured by a block 44 to a second bimetallic element 45. The left-hand end of bimetallic element 45 is secured to a fixed stationary support 46. The bimetallic elements 43 and 45 are disposed with their more highly expansive elements lowermost. The result of this is that if the ambient temperature changes, the effect on bimetallic element 43 resulting from this change in ambient temperature will be compensated for by the effect produced on bimetallic element 45. Thus if the ambient temperature increases, the left-hand end of member 43 will tend to move upwardly. This tendency is counteracted by the fact that the right-hand end of member 45 will move upwardly and tilt the member 43 counterclockwise, thereby tending to move the left-hand end of member 43 downwardly to the same extent as it tends to be moved upwardly by the warping of member 43. The result is that the left-hand end of bimetallic element 43 is positioned solely in accordance with the heat transmitted to it from heaters 40 and 41 and is unaffected by ambient temperature. Secured to this left-hand end of bimetallic element 43 is a pair of contact blades 49 and 50. The contact blades 49 and 50 are adapted to cooperate with contact blades 51 and 52, respectively. Contact blades 51 and 52 are carried by a slide member 53. The slide member 53 is provided with a slotted portion 54 which slidably embraces two pins 55 and 56. A spring 58 tends to bias the slide member 53 downwardly, the downward movement being limited by a stop pin 59. The upper end of rod 26 is adapted to engage the lower portion of slide member 53 so that as the valve disc 13 is moved away from its valve, slide member 53 along with contacts 51 and 52 are moved upwardly. The position of slide member 53 and contacts 51 and 52 is accordingly determined by the position of valve member 13 except when the slide member 53 is engaging the stop 59.

The contact blades 49 and 50 constitute the controlling contacts and, as will be explained later, are variably positioned in accordance with the value of the temperature to which thermostat 35 is subjected. The contact blades 51 and 52 constitute the follow up contacts. The contact blades 49 and 50 are insulated from one another as indicated at 62. These blades are moreover not uniformly spaced from contact blades 51 and 52, the spacing between blades 49 and 51 being less than that between blades 50 and 52.

Referring again to heaters 40 and 41, it was previously stated that the energization of these heaters is controlled by the thermostat 35. The bimetallic element 36 of thermostat 35 has located closely adjacent thereto an auxiliary heater 65, the energization of which is also controlled by the thermostat 35. The heaters 65, 40 and 41 are connected in series on the thermostat calling for heat. As indicated by the legend adjacent the thermostat blade 37, the blade is moved towards the contact 38 upon temperature fall and away from the contact 38 upon temperature rise. The result of the energization of heater 65 is to tend to move the contact arm 37 away from the contact 38. The time which is required for the heater 65 to move contact blade 37 away from contact 38 will be dependent upon the temperature of the medium surrounding bimetallic element 36. If the temperature is low, a relatively long time will be required for separation of switch blade 37 from contact 38 whereas when this temperature is relatively high, the separation will be effected within a relatively short time. The amount of time that thermostat 35 is calling for heat is accordingly dependent upon the temperature of the surrounding medium. The heater 65 is selected so as to have a relatively pronounced heating effect with the result that the thermostat 35 is intermittently opened and closed at rather frequent periods. This results in rather frequent energization and deenergization of heaters 40 and 41 for periods the length of which is dependent upon the temperature of the medium surrounding bimetallic element 36. The heat generated by the heater 40 will affect the bimetallic element 43 slightly later than heater 41. The result is that an effect analogous to the well known shading effect in an alternating current electro-magnet will be obtained. Where only one heater is used, the position of bimetallic element 43 tends to slowly shift back and forth as the heater is turned on and off. By selecting a bimetallic element having a relatively sluggish characteristic this movement back and forth can be reduced but cannot be eliminated to as great an extent as is desirable without making the bimetallic element too insensitive. By providing two heaters which are effective at different times, a more uniform application of heat to the bimetallic element 43 results. The result is that the position of bimetallic element 43 for any given temperature condition tends to be almost constant.

Also associated with the thermostat 35 are further heaters 67 and 68. These heaters have a different rate of heat delivery to the thermostatic element 36, the heater 68 delivering its heat much more rapidly than the heater 67. This can be accomplished in any suitable manner. Thus heater 67 can be insulated or can be of sufficiently greater mass than heater 68 that a considerable time is required for dissipation of the heat therefrom. The energization of the heaters 67 and 68 is controlled by a rheostat 69 comprising a resistance 70 and a sliding contact arm 71. The contact arm 71 is carried by the upper end of the slide 53 so that it is normally positioned in accordance with the position of valve 13. As valve 13 tends to move towards open position, slider 53 moves upwardly to decrease the amount of resistance 70 in the heater circuit and hence increase the current flow through heaters 67 and 68. Also controlling the energization of heaters 67 and 68 are a center tapped resistance 72 and a resistance 73 over both of which moves a manually positioned contact arm 74. The resistances 72 and 73 and cooperating contact arm 74 control the distribution of current between the two heaters 67 and 68, as will be more fully pointed out later.

The energization of motor 14 during a portion of the operation of the valve is controlled by a switch blade 77 which sequentially engages fixed contacts 78 and 79. The switch blade 77 is more widely spaced from contact 79 than from contact 78. The switch blade 77 is yieldably mounted at its lower end to a suitable support 80. Secured to the switch blade 77 is a resilient cam blade 81. This blade is secured to blade 77 at 82. Cooperating with the cam blade 81 is a pin 84 carried by an arm 85 projecting from rod 26. Upon the upward movement of the valve disc and consequently of rod 26, the pin 84 travels on the left-hand surface of cam blade 81. While the cam blade 81 is resilient, this blade cannot move inwardly because of the lower end thereof engaging the switch blade 77. The result is that as pin 84 moves upwardly the switch blade 77 is moved to the right to engage contacts 78 and 79. Upon the valve reaching open position, the pin 84 travels over the end of cam blade 81 permitting switch blade 77 to move to the left by reason of its natural bias, thereby moving out of engagement with contacts 78 and 79. The upper end of cam blade 81 is inclined to the left so that upon the downward movement of pin 84 this member travels on the right-hand side of resilient blade 81 and when it eventually reaches valve closed position passes out between the switch blade 77 and blade 81 to again assume the position shown in the drawing.

A pair of limit switches are provided for further controlling the energization of the motor. These limit switches are designated by the reference numerals 86 and 87. The limit switch 86 comprises cooperating blades 88 and 89. Blade 89 is slightly longer than blade 88 and projects into the path of pin 90 carried by rod 26. Upon the valve reaching its open position, switch blade 89 is engaged by pin 90 and is moved away from blade 88 to open the limit switch 86. The limit switch 87 similarly comprises a short blade 92 and a long blade 93, the long blade 93 lying in the path of pin 94 carried by rod 26. Upon rod 26 approaching valve closed position, the pin 94 engages the longer switch blade 93 to open the limit switch 87.

A step-down transformer 100 is employed for supplying low voltage power for operation of the system. This transformer comprises a line voltage primary 101 and a low voltage secondary 102. The primary 101 is connected to any suitable source of power (not shown).

Operation

The various elements of the system are shown in the position occupied when the controlling temperature is assuming a value requiring no operation of the heating plant. Let it be assumed that the temperature gradually begins to fall so as to eventually cause engagement of contact blade 37 with contact 38. When such engagement takes place, an energizing circuit will be established to heaters 65, 40, and 41 as follows: from the upper terminal of transformer 102 through conductors 104, 105 and 106, heater 65, conductor 108, bimetallic element 36, contact arm 37, contact 38, conductor 109, heaters 40 and 41 and conductors 110 and 111 to the other terminal of secondary 102. The result of the establishment of this circuit is to cause simultaneous energization of heaters 65, 40, and 41. As previously pointed out, the energization of heater 65 will eventually cause separation of switch blade 37 from contact 38. In view of the fact that the temperature is sufficiently high that engagement of switch blade 37 with contact 38 has just been effected, the separation of these members resulting from the energization of heater 65 will presumably take place within a short period of time. During this period of time, the heater 41 supplies a certain amount of heat to the bimetallic element 43 and shortly after this as heater 41 begins to supply less heat to bimetallic element 43, the heater 40 will also heat bimetallic element 43. The result of this heating of bimetallic element 43 will be that the left-hand end of the bimetallic elements is moved upwardly slightly, carrying with it contacts 49 and 50. Since the room temperature has been relatively high, the contact blades 49 and 50 will presumably not be engaged with contacts 51 and 52 until the thermostat blade 37 has been engaged and disengaged from contact 38 a number of times. Since no heat is being supplied to this system and the temperature is dropping, the length of such engagement will presumably be longer each time so that the left-hand end of bimetallic element 43 will tend to move upwardly, always assuming a position corresponding to the value of the room temperature. As this upward movement continues, switch blade 49 will first engage with contact 51. Nothing will happen as a result of this engagement. Upon engagement of contacts 50 and 52 however, the following energizing circuit will be established to the lifting winding 16: from the upper end of secondary 102 through conductors 104, 105, 115 and 116, switch blade 52, switch blade 50, conductors 117 and 118, switch blades 88 and 89, conductor 120, lifting winding 16, conductor 121 and conductor 122 to the other terminal of secondary 102. The energization of the lifting field winding 16 will cause rotation of the motor so as to cause rotation of gear 19 in a counter-clockwise direction. As previously explained, this will result in upward movement of hook 22 to cause opening of valve 13. Upon initial movement of valve 13 in open direction, the upward movement of pin 94 will permit closure of limit switch 87 so as to establish the following circuit through the holding winding 17: from the upward terminal of secondary 102 through conductors 104, 105, 115 and 116, switch blade 51, switch blade 49, conductors 125 and 126, switch blades 93 and 92, conductor 128, holding field winding 17, and conductor 122 to the other terminal of secondary 102.

The initial upward movement of the valve 13 causes pin 84 to ride up the cam blade 81 moving switch blade 77 into engagement with contacts 78 and 79. Upon switch blade 77 so engaging with contact 78, the following energizing circuit will be established to the holding winding 17: from the upper terminal of secondary 102 through conductors 104, 105, 115 and 130, switch blade 77, contact 78, conductor 131, conductor 126, switch blades 93 and 92, conductor 128, holding winding 17 and conductor 122 to the other terminal of secondary 102. Upon engagement of switch blade 77 with contact 79, the following circuit will also be established to the lifting winding 16: from the upper end of secondary 102 through conductors 104, 105, 115 and 130, switch blade 77, contact 79, conductors 132 and 118, switch blades 88 and 89, conductor 120, lifting winding 16, and conductors 121 and 122 to the other terminal of secondary 102. It will be noted that the two circuits just traced to the holding and lifting windings respectively are independent of the engagement of switch blades 49 and 50 with switch blades 51 and 52. With both the holding and lifting windings energized, the motor will continue to rotate moving valve 13 against the action of spring 30 towards open position. This movement will continue uninterruptedly until the pin 84 rides over the end of cam blade 81, at which time the switch blade 77 will spring back to the position shown. This will take place when the valve is nearly wide open. Since the upward movement of the rod 26 has carried the slider 53 upwardly, switch blades 51 and 52 will no longer be in engagement with switch blades 49 and 50. Thus, as soon as switch blade 77 separates from contacts 78 and 79, the motor will be completely deenergized so that the biasing spring 30 is able to move valve 13 downwardly towards closed position. This downward movement will continue until such time as switch blade 51 engages switch blade 49. Upon such engagement taking place, the circuit through holding winding 17 previously traced through switch blades 49 and 51 and limit switch 87 will be reestablished. The holding winding 17 is capable of exerting sufficient torque to hold the valve against the action of biasing spring 30 although it is not capable of lifting the valve. The result of the energization of the holding winding will accordingly be to hold the valve against further downward movement. The valve will now occupy a position corresponding to the position of contact blades 49 and 50 which, as previously indicated, corresponds to the value of the controlling temperature. It will be noted that the valve, as soon as it is given any movement at all, is moved quickly to wide open position and is then returned to the position called for by the controlling temperature. This insures that there will be adequate purging of the burner and that proper combustion will be initially established at the burner.

It may so happen that the spring 30 will impart sufficient momentum to the valve and the gear train so that the energization of holding winding 16 will not abruptly terminate downward movement of the valve. This will not be harmful however, inasmuch as any further downward movement results in the engagement of switch blades 52 and 50. As soon as these blades have engaged, the circuit to lifting winding 16 previously traced will be reestablished so that both the lifting and holding windings are now energized. The energization of both sets of windings will result in considerable torque in valve opening direction so as to terminate further downward movement of the valve and initiate upward movement of the valve. This upward movement will continue until switch blade 52 has separated from switch blade 50, at which time the circuit to the lifting winding will be interrupted and only the holding winding will remain energized.

If the controlling temperature adjacent thermostat 35 should drop still farther, the periods of engagement of thermostat blade 37 with contact 38 will be increased so that contact blade 50 will again be moved into engagement with contact blade 52. This will again cause energization of the lifting winding 16 so that the valve will again be moved towards open position. As soon as the valve has moved sufficiently far to separate follow up switch blade 52 from controlling switch blade 50, the lifting winding will again be deenergized and the valve will remain in the new position. If the controlling temperature drops sufficiently to move the valve to its fully open position, the limit switch blade 89 will be separated from blade 88 to interrupt the circuit to lifting winding 16 and thereby prevent further opening of the valve.

If on the other hand the temperature adjacent bimetallic element 36 increases, the periods of engagement of switch blade 37 with contact 38 will be decreased so that contact blades 49 and 50 will move downwardly causing separation of switch blade 49 from contact 51. As soon as these two blades separate, the circuit to the holding winding 17 is interrupted so that the spring 30 is free to move the valve downwardly. This downward movement will continue until switch blade 51 again reengages switch blade 49 so as to reenergize holding winding 17. If the temperature rises sufficiently far, the valve 13 will move downwardly to the point where further downward movement of slide member 53 is prevented by its engagement with stop 59. Thereafter it is impossible for switch blades 49 and 51 to reengage so that the motor remains deenergized and the valve continues down to its completely closed position. The valve position corresponding to the position of slider 53 when it engages stop 59 is the minimum position at which the flow of fuel is adequate to support combustion. The stop 59 can conveniently be made adjustable so that this point of minimum flow can be adjusted in accordance with the particular burner with which the valve is used. When the valve moves to its completely closed position the limit switch 87 is opened. This insures that the motor will not be reenergized until the energizing circuit for the lifting winding is reestablished. This insures against any tendency of the motor, when only its holding winding is energized, to counteract the effect of spring 30 sufficiently to prevent proper seating of the valve without actually opening the valve.

In the preceding description of the operation of the system no reference has been made to the heaters 67 and 68. It will be noted that these heaters are constantly energized. The energizing circuit for heater 68 is as follows: from the upper end of secondary 102 through conductors 104 and 135, heater 68, conductor 136, the upper portion of resistance 73, contact arm 74, the portion of resistance 72 between contact arm 74 and the center tap of resistance 72, conductor 138, resistance 70, contact arm 71 and conductors 139 and 111 to the lower terminal of secondary 102. The circuit to heater 67 is as follows: from the upper terminal of secondary 102 through conductors 104 and 135, heater 67, conductor 141, the lower portion of resistance 73, contact arm 74, resistance 72, conductor 138, resistance 70, contact arm 71, and conductors 139 and 111 to the other terminal of secondary 102. The continuous application of heat from the heaters 67 and 68 results in the control point of thermostat 35 being slightly lowered. In other words, the thermostat operates as though the temperature of the surrounding medium were higher than it actually is. As valve 13 is moved towards open position, thereby increasing the heat supplied to the furnace in which the burner is located, the portion of resistance 70 included in the circuit of heaters 67 and 68 is reduced. This tends to increase the heat delivered by these heaters to bimetallic element 36. This is highly desirable inasmuch as compensation is thereby made for the heat stored in the heating system. The heat that is stored in the heating system will eventually be delivered to the room after a time interval depending upon the lag of the heating system. If the thermostat setting is not lowered in accordance with this heat stored in the system, the thermostat would continue to call for an increased amount of heat until the increased heat has actually affected the thermostatic element 36. Thereafter, even though the thermostat acts to reduce the supply of heat, the heat stored in the system will continue to enter the space in which thermostat 35 is located to cause over-shooting of the temperature. With applicant's arrangement, the further opening of valve 13 produces an increased heating effect which tends to cause the thermostat 35 to anticipate the arrival of the heat. It is thus possible for a very uniform temperature to be maintained by the present system.

In connection with heaters 67 and 68, it will be realized that it is highly essential that the rate of delivery of the heat by heaters 67 and 68 bears a definite relation to the heating lag of the system. If the heaters 67 and 68 deliver the heat too quickly to bimetallic element 36, the setting of this thermostat will be reduced prematurely tending to produce a drop in the temperature of the space. If, on the other hand, the heater supplies the heat to bimetallic element 36 too slowly, the temperature will tend to overshoot although not to as great a degree as if the heaters were not present. I therefore find it highly desirable to provide means for adjusting the rate of heat delivery to the thermostat 35. It is for this reason that two heaters 67 and 68 are provided, heater 68 having a relatively faster rate of heat delivery than heater 67. By adjusting the position of arm 74, the division of current between heaters 67 and 68 is varied. Thus in the position of contact arm 74 shown, the greater portion of the current passes through resistance 67 and the smaller portion through the quickly heating resistor 68. The result is that the heaters 68 and 67 will tend to deliver their heat more slowly to thermostatic element 36. If the arm 74 is moved upwardly with respect to resistance 73, the proportion of the amount of current passing through heater 68 will be increased with respect to that passing through heater 67 so as to increase the rate at which the heat is delivered by heaters 67 and 68 to the bimetallic element 36. It is desired that, while the rate of heat delivery is varied, the total amount of heat supplied by heaters 67 and 68 be left unchanged. It will be obvious from the well known laws concerning parallel connected resistances that the total resistance of the portion of the circuit between conductor 135 and contact arm 74 is decreased whenever contact arm 74 is moved away from the mid position of resistor 73. If means were not provided to compensate for this, the result would be that the total heat supplied by heaters 67 and 68 would be increased when the slider 74 was away from its mid position. In order to compensate for this, the center tapped resistance 72 is provided, which resistance also cooperates with contact arm 74. When contact arm 74 is moved away from the mid position, the resistance in the circuit is increased by the amount of resistance between the mid point of resistance 72 and the point at which contact arm 74 engages the resistance. The resistance 72 is so selected that this additional resistance introduced into the circuit will just compensate for the decrease in resistance caused by moving contact arm 74 away from the mid point of resistance 73. The result is that the total resistance of the heater circuit remains unchanged. The only manner in which this resistance is changed during the operation is by movement of contact arm 71 over resistance 70.

It will be seen that I have devised a new and improved temperature control system wherein the flow of gas to a gas burner may be successfully modulated and wherein recognition is made of the various factors necessary to maintenance of a constant temperature under varying load conditions. While I have shown a specific embodiment of my invention for purposes of illustration, it is to be understood that the invention is limited only by the scope of the appended claims.

I claim as my invention:

1. In combination, a flow controlling member for controlling the flow of fuel to a burner, an electric motor for positioning said flow controlling member, controlling contact means, means for variably positioning said controlling contact means in accordance with a condition indicative of the demand for burner operation, follow-up contact means adapted to be engaged by said controlling contact means, means for positioning said follow-up contact means in accordance with the position of said flow controlling member, an energizing circuit for said motor and controlled by said controlling and follow-up contact means whereby said flow controlling member is modulatingly positioned in accordance with the position of said controlling contacts, and means operative upon said flow controlling member being in one extreme position and said controlling contacts being moved to a predetermined position to energize said motor independently of said controlling and follow-up contacts and in such a manner as to cause said flow controlling member to move to its other extreme position and back to a position corresponding to the position of the controlling contacts.

2. In combination, a flow controlling member biased to a minimum flow position, an electric motor for moving said flow controlling member against its bias towards full flow position, controlling contact means, means for variably positioning said controlling contact means in accordance with the value of a controlling condition, follow-up contact means adapted to be engaged by said controlling contact means, means for positioning said follow-up contact means in accordance with the position of said flow controlling member, an energizing circuit for said motor and controlled by said controlling and follow-up contact means whereby said flow controlling member is modulatingly positioned, and means operative upon said flow controlling member being in its minimum flow position and said controlling contacts being moved to a predetermined position to energize said motor independently of said controlling and follow-up contacts until said flow controlling member reaches full flow position whereby said flow controlling member is moved continuously to full flow position and is then moved back by its bias to a position corresponding to the controlling contacts at which position the follow-up contacts engage the controlling contacts to energize the motor and terminate movement of said flow controlling member.

3. In combination, a flow controlling member, an electric motor for positioning said flow controlling member, controlling contact means, a temperature responsive element for positioning said controlling contact means, a heater adjacent said temperature responsive element, condition responsive means for periodically causing operation of said heater at intervals the length of which is dependent upon the value of said condition so that said controlling contacts are variably positioned in accordance with the value of said controlling condition, follow-up contact means adapted to be engaged by said controlling contact means, means for positioning said follow-up contact means in accordance with the position of said flow controlling member, an energizing circuit for said motor and controlled by said controlling and follow-up contact means whereby said flow controlling member is modulatingly positioned in accordance with the position of said controlling contacts, and means operative upon said flow controlling member being in one extreme position and said controlling contacts being moved to a predetermined position to energize said motor independently of said controlling and follow-up contacts and in such a manner as to cause said flow controlling member to move to its other extreme position and back to a position corresponding to the position of the controlling contacts.

4. In a temperature control system, temperature changing means, a regulator therefor movable between a heat decreasing and a heat increasing position, means under the control of a temperature responsive device for modulatingly positioning said regulator in accordance with the temperature affecting said temperature responsive device, a pair of parallel connected electric heaters adjacent the temperature responsive element of said temperature responsive device, one of said heaters having a different rate of heat transfer than the other, impedance means associated with said regulator for increasing the current flow to said heaters as said regulator is moved towards heat increasing position, and further adjustable impedance means for varying the division of current between said heaters thereby to vary the rate of heat transfer of the two heaters as a whole.

5. In a temperature control system, temperature changing means, a regulator therefor movable between a heat decreasing and a heat increasing position, means under the control of a temperature responsive device for positioning said regulator, a pair of parallel connected electrical heaters adjacent the temperature responsive element of said temperature responsive device to vary the operation of said temperature responsive device, one of said heaters having a different rate of heat transfer than the other, and adjustable impedance means to vary the division of current between said heaters to vary the rate of heat transfer of said heaters as a whole.

6. In a temperature control system, temperature changing means, a regulator therefor movable between a heat decreasing and a heat increasing position, means under the control of a temperature responsive device for positioning said regulator, a pair of parallel connected electrical heaters adjacent the temperature responsive element of said temperature responsive device to vary the operation of said temperature responsive device, one of said heaters having a different rate of heat transfer than the other, adjustable impedance means to vary the division of current between said heaters to vary the rate of heat transfer of said heaters as a whole, and further impedance means simultaneously adjustable with said previously named impedance means for maintaining the total impedance of the heater circuit substantially constant regardless of the division of current between said heaters.

7. In combination, a member to be positioned, actuating means for said member including a temperature responsive element, means for heating said element having a plurality of simultaneously energizable portions having different rates of heat delivery to said element, and condition responsive means for intermittently energizing said heating means for periods of time variable in length in accordance with the value of the condition, said portions being effective to make the intervals during which heat is delivered to said element substantially greater than the intervals during which said heating means is energized.

8. In combination, condition responsive means for intermittently closing an electrical circuit for intervals variable in length in accordance with the value of the condition, electrical heating means controlled by said circuit and having a heat insulated portion and an uninsulated portion, a temperature responsive element adjacent said heating means, and a member positioned by said element in accordance with the value of said condition, said portions being effective to make the intervals during which heat is delivered to said element substantially greater than the intervals during which said circuit is closed.

9. In combination, condition responsive means for intermittently closing an electrical circuit for intervals variable in length in accordance with the value of the condition, electrical heating means controlled by said circuit and having a plurality of portions having different rates of heat delivery, a temperature responsive element adjacent said heating means, and a member positioned by said element in accordance with the value of said condition, said portions being effective to make the intervals during which heat is delivered to said element substantially greater than the intervals during which said circuit is closed.

10. In combination, condition responsive means for intermittently closing an electrical circuit for intervals variable in length in accordance with the value of the condition, heating means controlled by said circuit and having a portion thereof insulated to retard the delivery of heat therefrom, a temperature responsive element adjacent said heating means, and a member positioned by said element in accordance with the value of said condition, said insulated portion being effective to make the intervals during which heat is delivered to said element substantially greater than the intervals during which said circuit is closed.

11. In combination, a member to be positioned in accordance with the temperature of a controlling medium, actuating means for said member including a temperature responsive element, first electrical heating means for said element including a plurality of portions having different rates of heat delivery, a thermostatic switch subject to the temperature of said controlling medium so as to close when said temperature drops to a predetermined value, second electrical heating means adjacent said switch, first energizing circuit means for said second heating means controlled by said switch and effective to cause intermittent closure of said switch for intervals variable in length in accordance with the temperature of the controlling medium, and second energizing circuit means for said first heating means closed by said switch simultaneously with said first circuit means, said portions being effective to make the intervals during which heat is delivered to said element substantially greater than the intervals during which said circuit is closed.

12. In combination, a flow controlling member movable between minimum flow and maximum flow positions, means biasing said member to said minimum flow position, electrical motor means including a lifting winding effective when energized to overcome said biasing means and drive said member toward said maximum flow position and a holding winding effective when energized to hold said member from movement toward said minimum flow position by said biasing means, a pair of controlling contacts, means for variably positioning said controlling contacts in accordance with the value of a controlling condition, a pair of follow-up contacts, means for positioning said follow-up contacts in accordance with the position of said member, said follow-up contacts being positioned so as to be sequentially engaged by said controlling contacts as said pairs of contacts move together and to separate in reverse sequence as said pairs move apart, an energizing circuit for said lifting winding including the last of said controlling and follow-up contacts to engage, and an energizing circuit for said holding winding including the first of said controlling and follow-up contacts to engage.

13. In combination, a member movable between a first safe position and a second active position, means biasing said member to said first position, electrical motor means including a lifting winding effective when energized to overcome said biasing means and drive said member toward said second position and a holding winding effective when energized to hold said member from movement toward said first position by said biasing means, a first pair of contacts movable in accordance with the movements of said member, a second pair of contacts, each contact of said second pair being engageable with a corresponding contact of said first pair, means responsive to a condition indicative of the need for operation of said member for modulatingly positioning said second pair of contacts, a circuit for said lifting winding including a switch comprising one of each of said pairs of contacts, and a circuit for said holding winding including a switch comprising the other of each of said pairs of contacts.

14. In combination, a member movable between a first safe position and a second active position, means biasing said member to said first position, electrical motor means including a lifting winding effective when energized to overcome said biasing means and drive said member toward said second position and a holding winding effective when energized to hold said member from movement toward said first position by said biasing means, a first pair of contacts movable in accordance with the movements of said member, a second pair of contacts, each contact of said second pair being engageable with a corresponding contact of said first pair, means responsive to a condition indicative of the need for operation of said member for modulatingly positioning said second pair of contacts, a circuit for said lifting winding including a switch comprising one of each of said pairs of contacts, a circuit for said holding winding including a switch comprising the other of each of said pairs of contacts, said lifting winding switch contacts being separated more widely than said holding winding switch contacts, so that upon movement of said pairs of contacts towards each other, said switches sequentially close, and upon movement of said pairs of contacts away from each other, said switches open in reverse sequence, said holding circuit switch being the first to close and the last to open.

WILLIS H. GILLE.